United States Patent
Jo et al.

(10) Patent No.: US 10,621,171 B2
(45) Date of Patent: Apr. 14, 2020

(54) METHOD FOR SEARCHING FOR DATA IN STORAGE DEVICE

(71) Applicant: SAMSUNG ELECTRONICS CO., LTD., Suwon-si (KR)

(72) Inventors: Insoon Jo, Hwaseong-si (KR); Sungho Yoon, Seoul (KR); Duckho Bae, Seoul (KR); MoonSang Kwon, Seoul (KR); Sangyeun Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 349 days.

(21) Appl. No.: 15/131,490

(22) Filed: Apr. 18, 2016

(65) Prior Publication Data

US 2017/0046389 A1 Feb. 16, 2017

(30) Foreign Application Priority Data

Aug. 11, 2015 (KR) .......................... 10-2015-0113396

(51) Int. Cl.
*G06F 16/2453* (2019.01)

(52) U.S. Cl.
CPC .............................. *G06F 16/24545* (2019.01)

(58) Field of Classification Search
CPC ......... G06F 17/30466; G06F 17/30463; G06F 17/30477; G06F 17/30442; G06F 17/30864; G06F 17/30454; G06F 17/30867; G06F 17/30498; G06F 17/30424; G06F 17/30

See application file for complete search history.

(56) References Cited

U.S. PATENT DOCUMENTS

| | | | |
|---|---|---|---|
| 6,003,022 A * | 12/1999 | Eberhard | G06F 11/34 |
| 7,343,369 B2 | 3/2008 | Faunce et al. | |
| 7,552,121 B2 | 6/2009 | Barsness et al. | |
| 7,636,707 B2 | 12/2009 | Chaudhuri et al. | |
| 7,679,133 B2 | 3/2010 | Son et al. | |
| 7,945,557 B2 | 5/2011 | Cheng et al. | |
| 8,224,806 B2 | 7/2012 | Al-Omari et al. | |
| 8,553,466 B2 | 10/2013 | Han et al. | |
| 8,559,235 B2 | 10/2013 | Yoon et al. | |
| 8,577,903 B2 | 11/2013 | Cummings et al. | |
| 8,593,307 B2 | 11/2013 | Seo et al. | |
| 8,654,587 B2 | 2/2014 | Yoon et al. | |
| 8,812,491 B2 | 8/2014 | Singh et al. | |
| 8,849,840 B2 | 9/2014 | Zaydman et al. | |

(Continued)

FOREIGN PATENT DOCUMENTS

| | | |
|---|---|---|
| KR | 1020120109753 A | 10/2012 |
| WO | 2014151157 A2 | 9/2014 |

OTHER PUBLICATIONS

Wenbin Fang et al., "Mars: Accelerating MapReduce with Graphics Processors", IEEE Transactions on Parallel and Distributed Systems, vol. 22, No. 4, Apr. 2011, pp. 608-620.

(Continued)

*Primary Examiner* — Angelica Ruiz
(74) *Attorney, Agent, or Firm* — Sughrue Mion, PLLC

(57) ABSTRACT

A method of searching for data in a storage device is provided. The method includes determining, by the storage device, selectivity about read units of the storage device based on a query, with respect to each table stored in the storage device and searching for the data in the storage device based on the selectivity about the read units.

19 Claims, 14 Drawing Sheets

(56) References Cited

U.S. PATENT DOCUMENTS

| | | | |
|---|---|---|---|
| 9,063,982 B2 | 6/2015 | Bestgen et al. | |
| 2001/0037327 A1* | 11/2001 | Haas | G06F 16/24545 |
| 2005/0228779 A1 | 10/2005 | Chaudhuri et al. | |
| 2006/0059165 A1* | 3/2006 | Bosloy | H04L 49/355 |
| 2006/0106777 A1 | 5/2006 | Faunce et al. | |
| 2007/0226180 A1 | 9/2007 | Cheng et al. | |
| 2007/0299814 A1 | 12/2007 | Barsness et al. | |
| 2009/0121271 A1 | 5/2009 | Son et al. | |
| 2010/0318538 A1 | 12/2010 | Wyman et al. | |
| 2011/0029508 A1 | 2/2011 | Al-Omari et al. | |
| 2011/0216603 A1 | 9/2011 | Han et al. | |
| 2011/0233648 A1 | 9/2011 | Seol et al. | |
| 2012/0051143 A1 | 3/2012 | Yoon et al. | |
| 2012/0079175 A1* | 3/2012 | Flynn | G11C 7/1012 |
| | | | 711/103 |
| 2012/0242517 A1 | 9/2012 | Seo et al. | |
| 2013/0018898 A1 | 1/2013 | Forstmann et al. | |
| 2013/0097189 A1 | 4/2013 | Cummings et al. | |
| 2013/0132405 A1 | 5/2013 | Bestgen et al. | |
| 2013/0138627 A1 | 5/2013 | Zaydman et al. | |
| 2013/0138630 A1* | 5/2013 | Yang | G06F 17/30442 |
| | | | 707/716 |
| 2013/0279262 A1 | 10/2013 | Yoon et al. | |
| 2013/0297587 A1 | 11/2013 | Singh et al. | |
| 2013/0343131 A1* | 12/2013 | Wu | G11C 16/26 |
| | | | 365/185.24 |
| 2014/0281511 A1 | 9/2014 | Kaushik et al. | |
| 2015/0032684 A1* | 1/2015 | Gupta | G06F 17/30575 |
| | | | 707/600 |
| 2015/0127883 A1* | 5/2015 | Chen | G11C 11/5642 |
| | | | 711/103 |
| 2016/0034349 A1* | 2/2016 | Choi | G11C 11/5642 |
| | | | 714/764 |

OTHER PUBLICATIONS

Jaeyoung Do et al., "Query Processing on Smart SSDs: Opportunities and Challenges", SIGMOD'13, Jun. 22-27, 2013, New York, New York, USA, Total 10 pages.

Sangyeun Cho et al., "Active Disk Meets Flash: A Case for Intelligent SSDs", Parallel Data Laboratory, Carnegie Mellon University, CMU-PDL-11-115, Nov. 2011, Total 20 pages.

Chungmin Melvin Chen et al., "Adaptive Slectivity Estimation Using Query Feedback", SIGMOD '94 Proceedings of the 1994 ACM SIGMOD international conference on Management of data, Jun. 1994, Total 12 pages.

Clifford A. Lynch, "Selectivity Estimation and Query Optimization in Large Databases with Highly Skewed Distributions of Column Values", Proceedings of the 14th VLDB Conference Los Angeles, CA, 1988, pp. 240-251.

* cited by examiner

FIG. 5

| Number of field values | Number of selected field values corresponding to FP | SLT of field values |
|---|---|---|
| 1000 | 10 | 0.01 |

FIG. 6

| Number of read units | Number of selected read units corresponding to selected field values | SLT of read units |
|---|---|---|
| 100 | 10 | 0.1 |
| | 5 | 0.05 |
| | 2 | 0.02 |
| | 1 | 0.01 |

FIG. 9

| S1 | Select first SPN read units from among read units corresponding to locations |
|---|---|
| S2 | Select last SPN read units from among read units corresponding to locations |
| S3 | Select middle SPN read units from among read units corresponding to locations |
| S4 | Select SPN read units randomly from among read units corresponding to locations |
| S5 | Select SPN read units according to pattern from among read units corresponding to locations |
| S6 | Select one of S1 to S5 sequentially |
| S7 | Select one of S1 to S5 randomly |
| S8 | Select one of S1 to S5 according to pattern |

FIG. 18
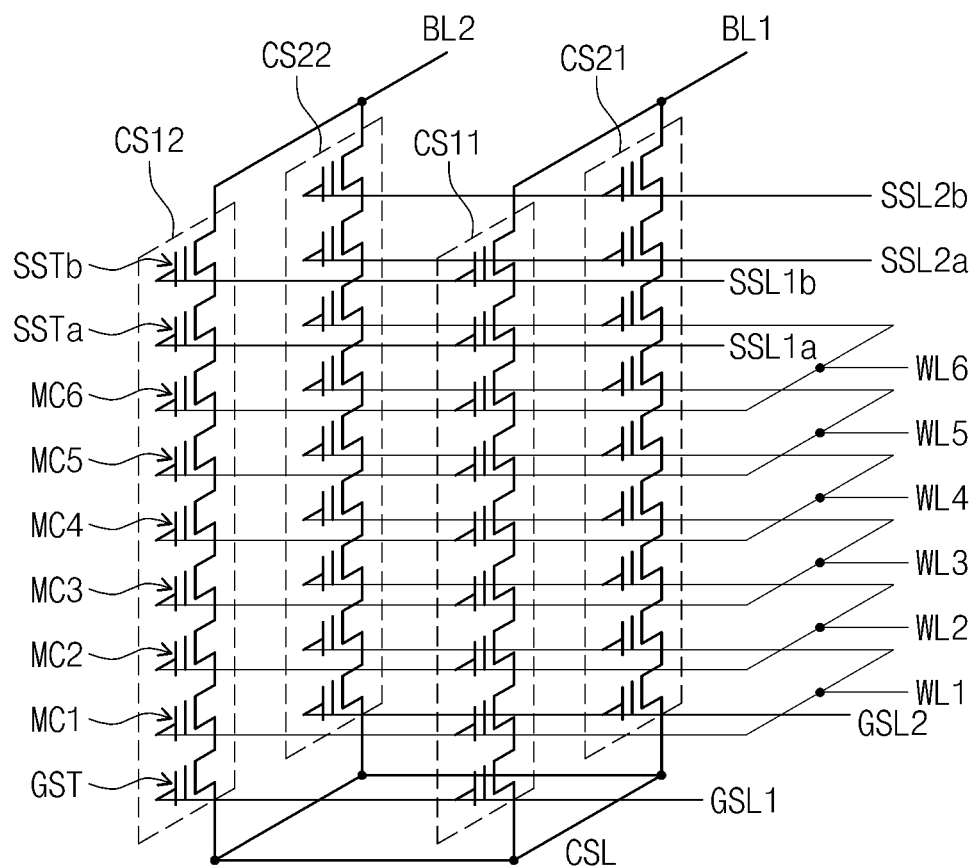
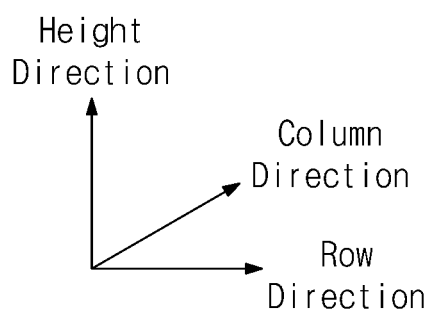

METHOD FOR SEARCHING FOR DATA IN STORAGE DEVICE

CROSS-REFERENCE TO RELATED APPLICATION

This application claims priority from Korean Patent Application No. 10-2015-0113396, filed Aug. 11, 2015, in the Korean Intellectual Property Office, the disclosure of which is incorporated herein in its entirety by reference.

BACKGROUND

Methods consistent with exemplary embodiments relate to an operating method of a storage device, and more particularly, a method of searching for data in a storage device.

A storage device may store data transmitted from an external host device. To manage and search for data stored in the storage device, various types of database structures or database systems are being studied.

A part of a database structure or a database system is based on a structured query language (SQL). In the SQL-based database structure or database system, a user or a host device transmits a query including a search target or a search object to the database structure or the database system to search for data stored in a storage device. The database structure or the database system analyzes the query, generates a query plan, and searches for data in the storage device based on the query plan. A processing quality (e.g., processing speed) about a query is determined according to a time taken for a data search performed according to the query plan. As the time taken for a data search increases, a processing speed about a query decreases, thereby reducing a processing quality about a query.

To improve a processing quality (e.g., processing speed) about a query, a study about a device or a method of establishing an improved query plan is consistently required.

SUMMARY

One or more exemplary embodiments provide a method of searching for data in a storage device at an improved speed.

In accordance with an aspect of an exemplary embodiment, there is provided a method of searching for data in a storage device, the method including determining, by the storage device, selectivity about read units of the storage device based on a query, with respect to each table stored in the storage device and searching for the data in the storage device based on the selectivity about the read units.

In accordance with an aspect of another exemplary embodiment, there is provided a method of searching for data in a storage device, the method including receiving, by the storage device, locations in which the data are stored, a bit pattern about a filtering predicate, and an operator associated with the filtering predicate; counting, by the storage device, a number of first read units, which correspond to the bit pattern and the operator, from among second read units corresponding to the locations; determining, by the storage device, selectivity about the filtering predicate based on a ratio between the number of the first read units and a number of the second read units; and transmitting, by the storage device, the determined selectivity to a host device to be used to search for the data.

In accordance with an aspect of another exemplary embodiment, there is provided a method of searching for data in a storage device, the method including: detecting a filtering predicate from a query; selecting a table corresponding to the filtering predicate and determining selectivity of the table based on locations at which data of the table is stored, a bit pattern about the filtering predicate, and an operator associated with the filtering predicate; and determining the table as a first search target based on the selectivity.

BRIEF DESCRIPTION OF THE FIGURES

The above and/or other aspects will be more apparent by describing certain example embodiments with reference to the accompanying drawings in which:

FIG. 5 is a table for describing a method of calculating selectivity about field values;

FIG. 6 is a table for describing a method of calculating selectivity about read units;

FIG. 9 is a table for describing schemes for selecting read units based on a number of samples;

FIG. 18 is a circuit diagram illustrating a memory block according to an exemplary embodiment.

DETAILED DESCRIPTION

Figure 1:
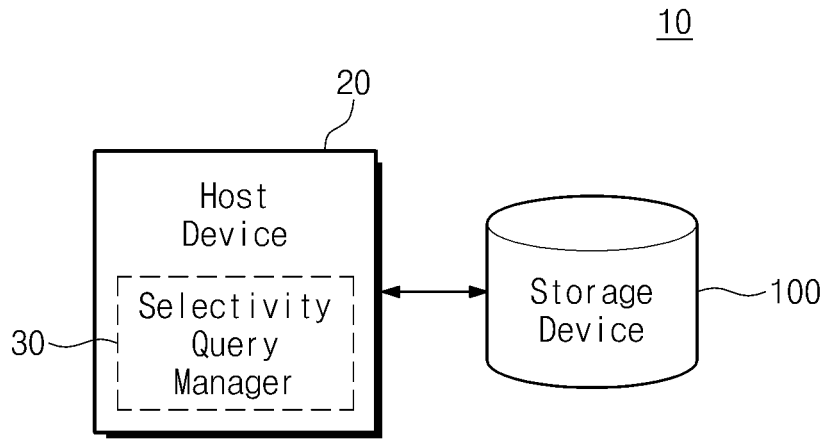
FIG. 1 is a block diagram illustrating a database server according to an exemplary embodiment.

Hereinafter, certain exemplary embodiments will be described with reference to the accompanying drawings.

The disclosure may, however, be embodied in many different forms and should not be construed as being limited to the exemplary embodiments set forth herein; rather, these exemplary embodiments are provided so that this disclosure will be thorough and complete, and will fully convey the disclosure to those of ordinary skill in the art. It should be understood, however, that there is no intent to limit the disclosure to the particular forms disclosed, but on the contrary, the disclosure is to cover all modifications, equivalents, and alternatives falling within the spirit and scope of the disclosure. In the drawings, the dimensions of structures are exaggerated for clarity.

FIG. 1 is a block diagram illustrating a database server 10 according to an example embodiment. Referring to FIG. 1, a database server 10 may include a storage device 100 and a host device 20.

Under control of the host device 20, the storage device 100 may write data transmitted from the host device 20, may read data requested by the host device 20, and may transmit the read data to the host device 20. For example, the storage device 100 may include a nonvolatile memory such as a flash memory, a phase-change random access memory (PRAM), a magneto-resistive random access memory (MRAM), a ferroelectric random access memory (FeRAM), a resistive random access memory (RRAM), or the like or a volatile memory such as a dynamic random access memory (DRAM), a static random access memory (SRAM), or the like.

The host device 20 may control the storage device 100, and the host device 20 may write data to or read data from the storage device 100. The host device 20 may receive a query from an external device or a user. The host device 20 may analyze the received query, may establish a query plan, and may search for data stored in the storage device 100 based on the query plan.

The host device 20 may include a selectivity query manager 30. The selectivity query manager 30 may determine a selectivity of a table which corresponds to a query or a predicate included in the query and may establish a query plan based on the determined selectivity. The host device 20 may search for data in the storage device 100 based on the query plan to which the selectivity is applied. In example embodiments, the selectivity query manager 30 may be implemented in the form of software executed in the host device 20, a hardware module installed or mounted on the host device 20, or a combination of the hardware module and software.

Figure 2:
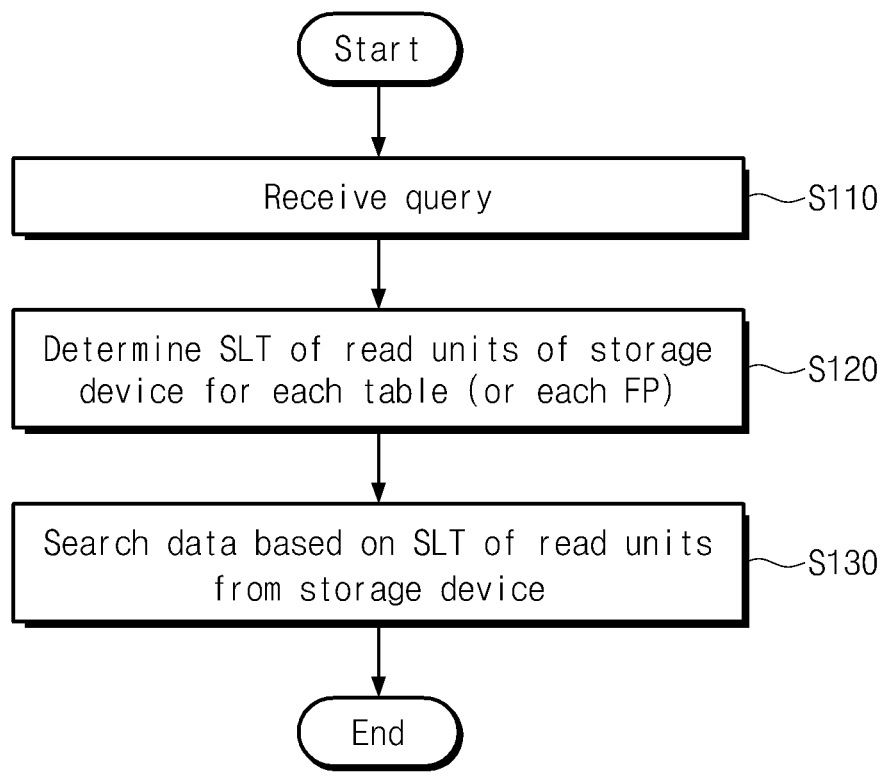
FIG. 2 is a flowchart illustrating a method of searching for data in a storage device, according to an exemplary embodiment.

FIG. 2 is a flowchart illustrating a method of searching for data in a storage device 100, according to an exemplary embodiment. Referring to FIGS. 1 and 2, in operation S110, the host device 20 may receive a query from an external device or a user.

In operation S120, the host device 20 or the storage device 100 may determine a selectivity SLT about read units of the storage device 100 with respect to each table stored in the storage device 100.

For example, the host device 20 may control the storage device 100 to read data in each table from the host device 20 and to determine the selectivity SLT about read units of the storage device 100. In this case, the host device 20 may obtain information about the read unit of the storage device 100 from the storage device 100 before determining the selectivity SLT.

In example embodiments, the host device 20 may control the storage device 100 such that the storage device 100 determines and reports the selectivity SLT about read units to the host device 20.

In example embodiments, a read unit of the storage device 100 may be a read unit of a memory device which is included in the storage device 100 and stores data (e.g., each table) which is an object to be found according to a query. For example, the read unit may be a size of data read by a memory device through a read operation based on a basic read command and a basic address where a separate option or a separate offset is not set. For example, the read unit may be a size of data read by a memory device through a read operation in a read mode, which has the highest throughput, from among read modes supported by the memory device.

In example embodiments, the selectivity SLT about read units may denote a ratio of read units, corresponding to a predicate included in a query, to read units in each of which a table is stored. For example, the predicate included in a query may include a filtering predicate (FP).

In operation S130, the host device 20 may search for data in the storage device 100 based on the selectivity SLT about read units. For example, the host device 20 may establish a query plan based on the selectivity SLT about read units of the storage device 100. The host device 20 may search for data in the storage device 100 based on the query plan to which the selectivity SLT is applied.

Figure 3:
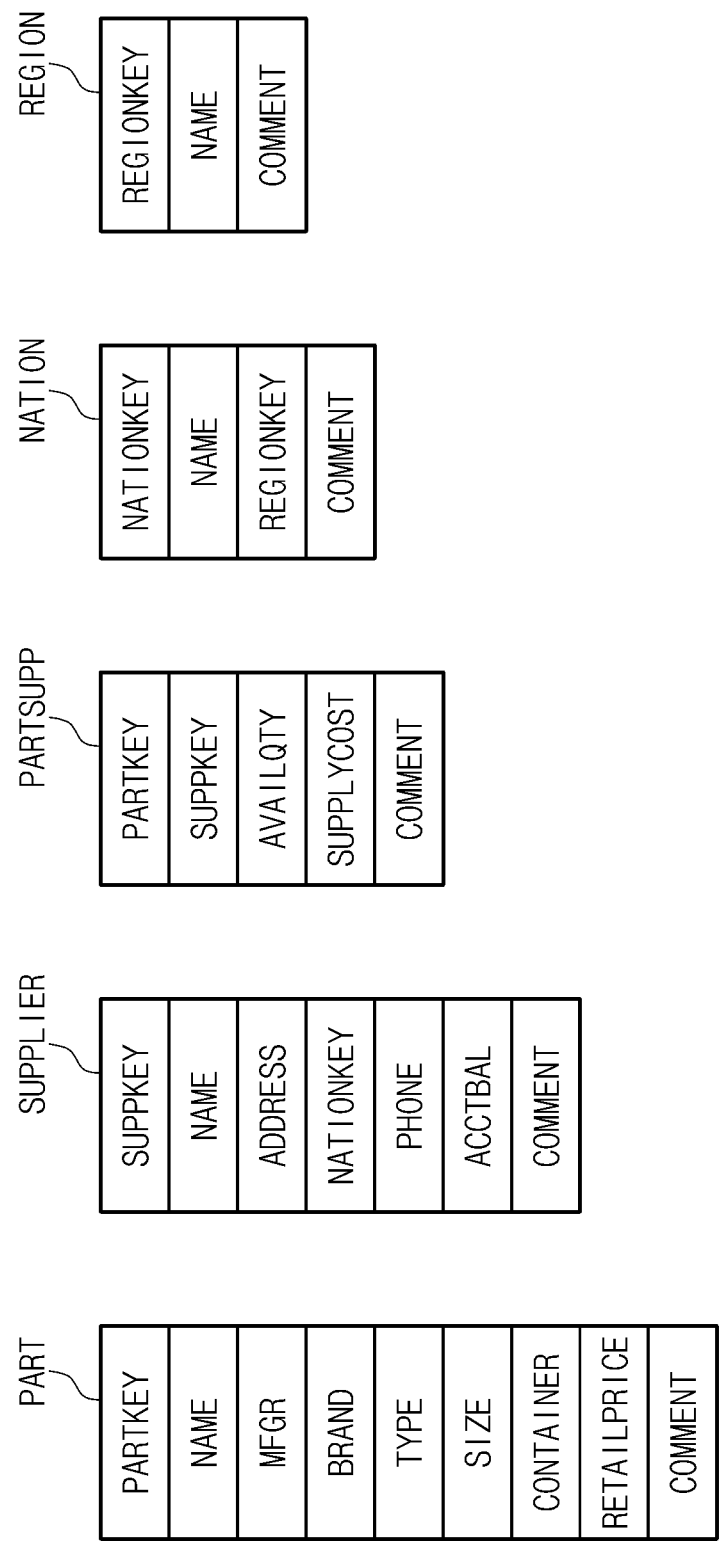
FIG. 3 is a diagram illustrating tables stored in a storage device.

FIG. 3 is a diagram illustrating tables stored in a storage device 100. In example embodiments, a PART table, SUPPLIER table, PARTSUPP table, a NATION table, and a REGION table of tables described in a transaction processing performance council BENCHMARK™ (TPC-H) are illustrated.

For example, the PART table may have 2,000,000 records. Each record in the PART table may have a PARTKEY field, a NAME field, an MFGR field, a BRAND field, a TYPE field, a SIZE field, a CONTAINER field, a RETAILPRICE field, and a COMMENT field. A field value corresponding to the PARTKEY field may be an identifier. A field value corresponding to the NAME field may be a variable text having a size of 55. A field value corresponding to the MFGR field may be a fixed text having a size of 25. A field value corresponding to the BRAND field may be a fixed text having a size of 10. A field value corresponding to the TYPE field may be a variable text having a size of 25. A field value corresponding to the SIZE field may be an integer. A field value corresponding to the CONTAINER field may be a fixed text having a size of 10. A field value corresponding to the RETAILPRICE field may be a decimal. A field value corresponding to the COMMENT field may be a variable text having a size of 23. In the PART table, the PARTKEY field may be a primary key.

The SUPPLIER table may have 100,000 records. Each record in the SUPPLIER table may have a SUPPKEY field, a NAME field, an ADDRESS field, a NATIONKEY field, a PHONE field, an ACCTBAL field, and a COMMENT field. A field value corresponding to the SUPPKEY field may be an identifier. A field value corresponding to the NAME field may be a fixed text having a size of 25. A field value corresponding to the ADDRESS field may be a variable text having a size of 40. A field value corresponding to the NATIONKEY field may be an identifier. A field value corresponding to the PHONE field may be a fixed text having a size of 15. A field value corresponding to the ACCTBAL field may be a decimal. A field value corresponding to the COMMENT field may be a variable text having a size of 101. In the SUPPLIER table, the SUPPKEY field may be a primary key.

The PARTSUPP table may have 9,000,000 records. Each record in the PARTSUPP table may have a PARTKEY field, a SUPPKEY field, an AVAILQTY field, a SUPPLYCOST field, and a COMMENT field. A field value corresponding to the PARTKEY field may be an identifier. A field value corresponding to the SUPPKEY field may be an identifier. A field value corresponding to the AVAILQTY field may be an integer. A field value corresponding to the SUPPLYCOST field may be a decimal. A field value corresponding to the COMMENT field may be a variable text having a size of 199. In the PARTSUPP table, the PARTKEY field and the SUPPKEY field may be a primary key.

The NATION table may have 25 records. Each record in the NATION table may have a NATIONKEY field, a NAME field, a REGIONKEY field, and a COMMENT field. A field value corresponding to the NATIONKEY field may be an identifier. A field value corresponding to the NAME field may be a fixed text having a size of 25. A field value corresponding to the REGIONKEY field may be an identifier. A field value corresponding to the COMMENT field may be a variable text having a size of 152. In the NATION table, the NATIONKEY field may be a primary key.

The REGION table may have five records. Each record in the REGION table may have a REGIONKEY field, NAME field, and a COMMENT field. A field value corresponding to the REGIONKEY field may be an identifier. A field value corresponding to the NAME field may be a fixed text having a size of 25. A field value corresponding to the COMMENT field may be a variable text having a size of 152.

In a second query of TPC-H, two filtering predicates may be used. Referring to a first filtering predicate, it may be required that a field value of the TYPE field in the PART table is "BRASS". Referring to a second filtering predicate, it may be required that a field value of the NAME field in the REGION table is "EUROPE". As such, a filtering predicate may relate to at least one table. According to an exemplary embodiment, the selectivity SLT about read units of the storage device 100 may be determined with respect to each filtering predicate or each table corresponding to each filtering predicate.

Figure 4:
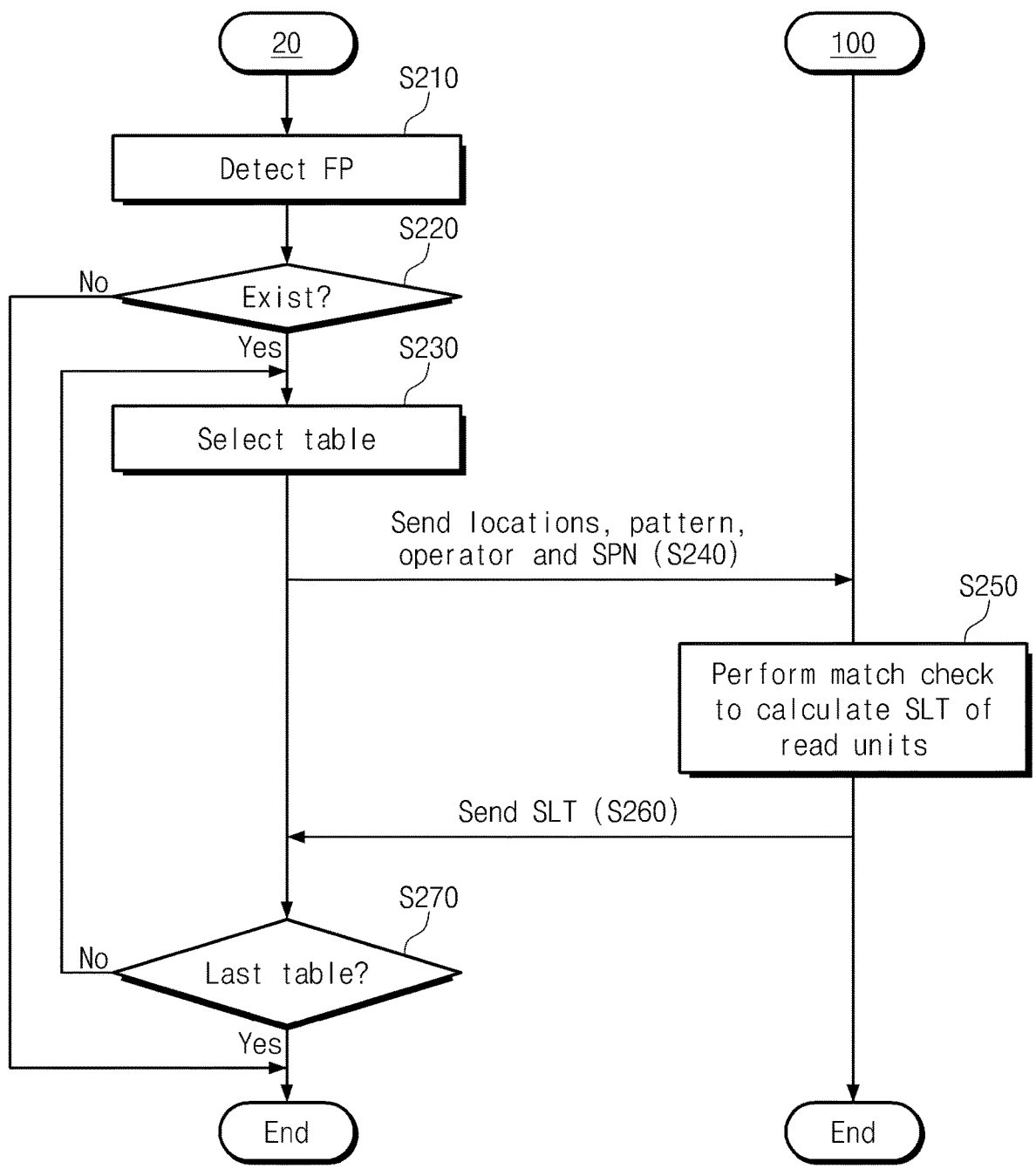
FIG. 4 is a flowchart illustrating a method of determining selectivity about read units by a storage device.

FIG. 4 is a flowchart illustrating a method of determining selectivity SLT about read units by a storage device 100. Referring to FIGS. 1 and 4, in operation S210, the host device 20 may detect a filtering predicate FP from a query. For example, when the query corresponds to the second query of the TPC-H, "BRASS" and "EUROPE" may be detected as the filtering predicate FP.

In operation S220, if the detected filtering predicate FP does not exist, determination of selectivity SLT may be ended. In operation S220, if the detected filtering predicate FP exists, the method may proceed to operation S230.

In operation S230, the host device 20 may select a table corresponding to at least one filtering predicate FP. For example, a PART table corresponding to "BRASS" that is a first filtering predicate or a REGION table corresponding to "EUROPE" that is a second filtering predicate may be selected.

In operation S240, the host device 20 may transmit locations of the storage device 100 at which data of the selected table is stored, a bit pattern, an operator, and the number of samples SPN to the storage device 100.

For example, the host device 20 may transmit, to the storage device 100, locations about field values in the selected table or locations about field values related to a filtering predicate about data in the selected table. For example, when two or more filtering predicates are designated in the selected table, the host device 20 may transmit locations of field values related to the two or more filtering predicates. The locations may include addresses of the storage device 100, respectively. Hereinafter, the term "locations" is used to refer to any one of locations related to the storage device 100, e.g., locations about field values in the selected table, locations about field values related to a filtering predicate about data in the selected table, addresses of the storage device 100, etc.

For example, the host device 20 may transmit a bit pattern about the filtering predicate FP to the storage device 100. For example, when the PART table is selected, a bit pattern of "BRASS" that is the first filtering predicate may be transmitted to the storage device 100. When the REGION table is selected, a bit pattern of "EUROPE" that is the second filtering predicate may be transmitted to the storage device 100. For example, when two or more filtering predicates are designated in the selected table, the host device 20 may transmit bit patterns about the two or more filtering predicates to the storage device 100.

For example, the host device 20 may transmit an operator related to the filtering predicate FP to the storage device 100. The operator may include '=', '<', '>', '<>', '<=', or the like. When one filtering predicate relates to two or more operators, the host device 20 may transmit the two or more operators related to the one filtering predicate to the storage device 100. When two or more filtering predicates are designated in the selected table, the host device 20 may transmit operators related to the two or more filtering predicates to the storage device 100.

For example, the host device 20 may transmit the number of samples SPN to the storage device 100. The number of samples SPN may denote the number of read units, which will be used when the selectivity SLT is determined, from among read units corresponding to locations transmitted to the storage device 100. For example, the number of samples SPN may be one or more and may be smaller than or equal to the number of read units corresponding to the locations. The host device 20 may set two or more filtering predicates such that each of the filtering predicates has the same number of samples or such that the number of samples of each of the filtering predicates is different from each other. When each of the filtering predicates is set to have the same number of samples, the host device 20 may transmit the same number of samples to the storage device 100 once. When the filtering predicates are set to have the different numbers of samples, the host device 20 may transmit each of the different numbers of samples to the storage device 100.

In operation S250, the storage device 100 may perform a match check and may calculate the selectivity SLT about read units. For example, the match check may be an operation to check whether there are bits, which correspond to a bit pattern and an operator, from among bits corresponding to the read units. For example, when the PART table is selected, the storage device 100 may check whether there are bits, which are the same as a bit pattern of "BRASS", from among data corresponding to the read units. For example, when the REGION table is selected, the storage device 100 may check whether there are bits, which are the same as a bit pattern of "EUROPE", from among data corresponding to the read units.

For illustrative purposes, it is described that whether there are bits, which are the same as a bit pattern in read units of the storage device 100, is checked during the match check. However, the match check may be variously performed according to kinds of operators. For example, whether there are bits, which have a value greater than a value of the bit pattern, from among data corresponding to read units, whether there are bits, which have a value smaller than a value of the bit pattern, from among data corresponding to read units, or whether there are bits, which have a value between values of bit patterns, from among data corresponding to read units may be checked.

The storage device 100 may calculate the selectivity SLT about read units based on a result of a match check. For example, read units, which correspond to a filtering predicate (e.g., read units including bits corresponding to a bit pattern and an operator), from among read units corresponding to the number of samples SPN may be detected. The storage device 100 may divide the detected read units by the number of the read units and may calculate the selectivity SLT about read units.

Accordingly, the selectivity SLT may denote a ratio of read units corresponding to the filtering predicate and the operator to read units corresponding to the number of samples SPN. The read units corresponding to the number of samples SPN may be a part or all of read units including field values related to the filtering predicate in the selected table.

In operation S260, the host device 20 may receive the selectivity SLT corresponding to the selected table from the storage device 100. In operation S270, when a table for calculating the selectivity SLT exists, operation S230 is performed. In operation S270, if the table in which the selectivity SLT is calculated is the last table (e.g., a table for calculating the selectivity SLT does not exist), determination of the selectivity SLT may be ended.

For illustrative purposes, it is described that calculation of the selectivity SLT is performed in the storage device 100. However, calculation of the selectivity SLT may be performed in, but not limited to, the storage device 100. For example, the host device 20 may read the read units from the storage device 100 and may calculate the selectivity SLT.

FIG. 5 is a table for describing a method of calculating selectivity SLT about field values. Referring to FIG. 5, the number of field values related to the filtering predicate FP in a selected table may be 1000. The number of the selected field values corresponding to the filtering predicate FP among field values of 1000 may be 10. In this case, a calculation result of the selectivity SLT about the field values may be 0.01.

FIG. 6 is a table for describing a method of calculating selectivity SLT about read units. In example embodiments, it is assumed that ten field values are included in one read unit. Referring to FIGS. 5 and 6, 1000 field values may be included in hundred read units. That is, the number of read units including field values related to a filtering predicate in the selected table may be a hundred.

In an exemplary embodiment, the ten selected field values corresponding to the filtering predicate FP may be distributed among ten read units. In this case, the number of the selected read units corresponding to the selected field values may be 10, and the selectivity SLT about read units may be 0.1.

In another exemplary embodiment, the ten selected field values corresponding to the filtering predicate FP may be distributed among five read units. In this case, the number of the selected read units corresponding to the selected field values may be five, and the selectivity SLT about read units may be 0.05.

In still another exemplary embodiment, the ten selected field values corresponding to the filtering predicate FP may be distributed among two read units. In this case, the number of the selected read units corresponding to the selected field values may be two, and the selectivity SLT about read units may be 0.02.

In yet another exemplary embodiment, the ten selected field values corresponding to the filtering predicate FP may be distributed among a read unit. In this case, the number of the selected read units corresponding to the selected field values may be one, and the selectivity SLT about read units may be 0.01.

That is, when the ten selected field values corresponding to the filtering predicate FP are distributed among k (e.g., k is an integer that is greater than or equal to one and smaller than or equal to ten) read units, a calculation result of the selectivity SLT about read units may be k/100.

In FIG. 5, a calculation result of the selectivity SLT about the field values may be 0.01. That is, when a filtering predicate is applied, search of a join predicate about field values of 1% of total field values is performed. However, the selectivity SLT about field values may not reflect the number of occurrences of a read operation performed to the storage device 100. For example, the selectivity SLT about read units may be changed according to a degree, at which the selected field values are distributed among read units, as illustrated in FIG. 6. When data is found by applying the selectivity SLT about read units, or when a query plan is established by applying the selectivity SLT about read units, the number of occurrences of a read operation performed to the storage device 100 may be reflected in a data search or the query plan. Accordingly, a speed at which data is found from the storage device 100 may be improved.

Figure 7:
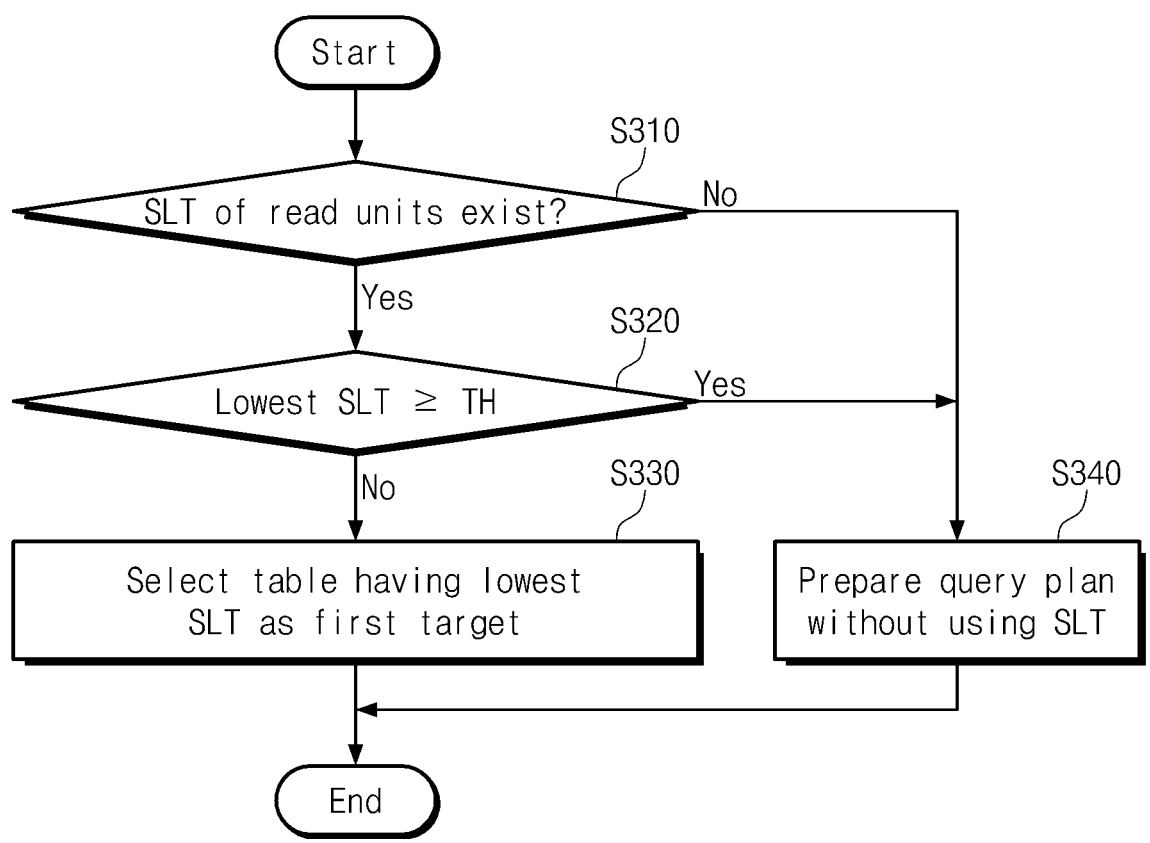
FIG. 7 is a flowchart illustrating a method of searching for data based on selectivity about read units, according to an exemplary embodiment.

FIG. 7 is a flowchart illustrating a method (e.g., operation S130) of searching for data based on selectivity SLT about read units, according to an exemplary embodiment. Referring to FIGS. 1 and 7, in operation S310, if selectivity SLT about read units exists, operation S320 may be performed. In operation S320, the host device 20 may determine whether the lowest selectivity SLT is greater than or equal to a threshold value TH. If the lowest selectivity SLT is smaller than the threshold value TH, operation S330 may be performed. In operation S330, the host device 20 may select a table, which has the lowest selectivity SLT, as a first target. The host device 20 may search for data in the table selected as the first target based on a join predicate.

If the selectivity SLT about read units does not exist, or if the lowest selectivity is greater than or equal to the threshold value TH, in operation S340, the query plan may be established without using the selectivity SLT about read units.

In example embodiments, if a filtering predicate is not in a query, or if an error occurs when the selectivity SLT is calculated, the selectivity SLT about read units may not exist.

In example embodiments, even when the selectivity SLT about read units is applied, the threshold value TH may be set such that a speed at which data is found may be improved or at least maintained. For example, the threshold value TH may have a value equal to or similar to 0.3.

Figure 8:
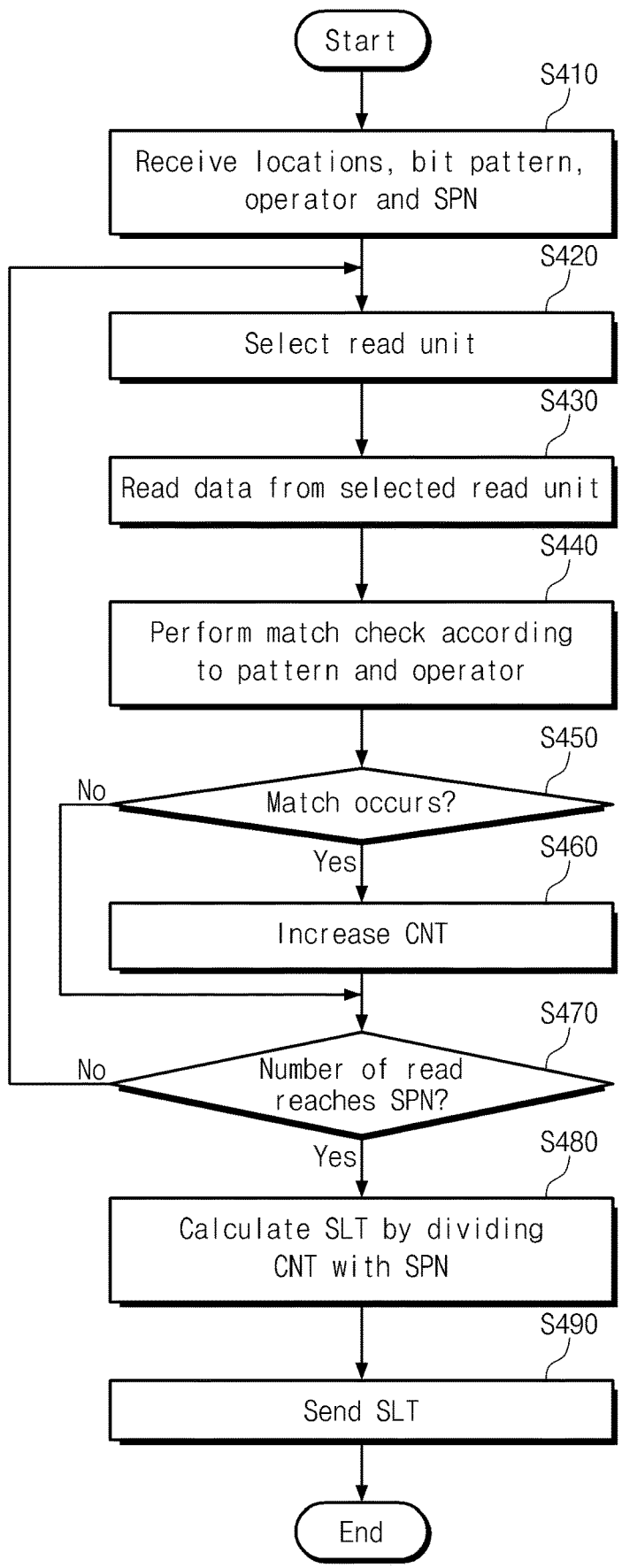
FIG. 8 is a flowchart illustrating a method of calculating selectivity about read units by a storage device when data is found from a storage device.

FIG. 8 is a flowchart illustrating a method of calculating selectivity SLT about read units by a storage device 100 when data is found from a storage device 100. Referring to FIGS. 1 and 8, in operation S410, the storage device 100 may receive locations, a bit pattern of the filtering predicate FP, an operator related to the filtering predicate FP, and the number of samples SPN. The locations may include addresses allocated in the storage device 100, respectively.

In operation S420, the storage device 100 may select read units, which correspond to the number of samples SPN, from among read units corresponding to the locations. Furthermore, the storage device 100 may select a first read unit among read units corresponding to the number of samples SPN.

In operation S430, the storage device 100 may read data from the selected read units.

In operation S440, the storage device 100 may perform a match check about the data, which is read from the selected read units, based on the bit pattern and the operator. If bits corresponding to the bit pattern and the operator exist in the data, in operation S450, it is determined that a match occurs. If the match occurs, in operation S460, a count CNT may increase. If the match does not occur, the count CNT may not increase.

In operation S470, it is determined whether the number of read operations reaches the number of samples SPN. For example, it is determined whether a match check about all read units corresponding to the number of samples SPN is completed. If the match check about all read units corresponding to the number of samples SPN is not completed, in operation S420, the next read units may be selected. In operations S430 to S460, the match check about the next read units may be performed.

If the match check about all read units corresponding to the number of samples SPN is completed, in operation S480, the storage device 100 may calculate the selectivity SLT by dividing the count CNT by the number of samples SPN. In operation S490, the storage device 100 may transmit the selectivity SLT to the host device 20.

FIG. 9 is a table for describing schemes for selecting read units based on the number of samples SPN. Referring to a first scheme S1 in FIG. 9, the storage device 100 may select read units, which correspond to first SPN read units, from among read units corresponding to locations transmitted from the host device 20. For example, the storage device 100 may select read units about the number of samples SPN corresponding to N (e.g., N is a natural number) successive addresses which include an address having the lowest value.

Referring to a second scheme S2, the storage device 100 may select read units, which correspond to last SPN read units, from among read units corresponding to the locations. For example, the storage device 100 may select read units about the number of samples SPN corresponding to N successive addresses which include an address having the highest value.

Referring to a third scheme S3, the storage device 100 may select read units, which correspond to middle SPN read units, from among read units corresponding to the locations. For example, the storage device 100 may select read units about the number of samples SPN corresponding to N successive addresses which are between the address having the lowest value and the address having the highest value.

Referring to a fourth scheme S4, the storage device 100 may randomly select read units, which correspond to the number of samples SPN, from among read units corresponding to the locations.

Referring to a fifth scheme S5, the storage device 100 may select read units, which correspond to the number of samples SPN, based on a pattern, from among read units corresponding to the locations. For example, odd-numbered read units, even-numbered read units, or the like may be selected.

Referring to a sixth scheme S6, the storage device 100 may sequentially select one of the first to fifth schemes S1 to S5.

Referring to a seventh scheme S7, the storage device 100 may randomly select one of the first to fifth schemes S1 to S5.

Referring to an eighth scheme S8, the storage device 100 may select one of the first to fifth schemes S1 to S5 based on a pattern.

Figure 10:
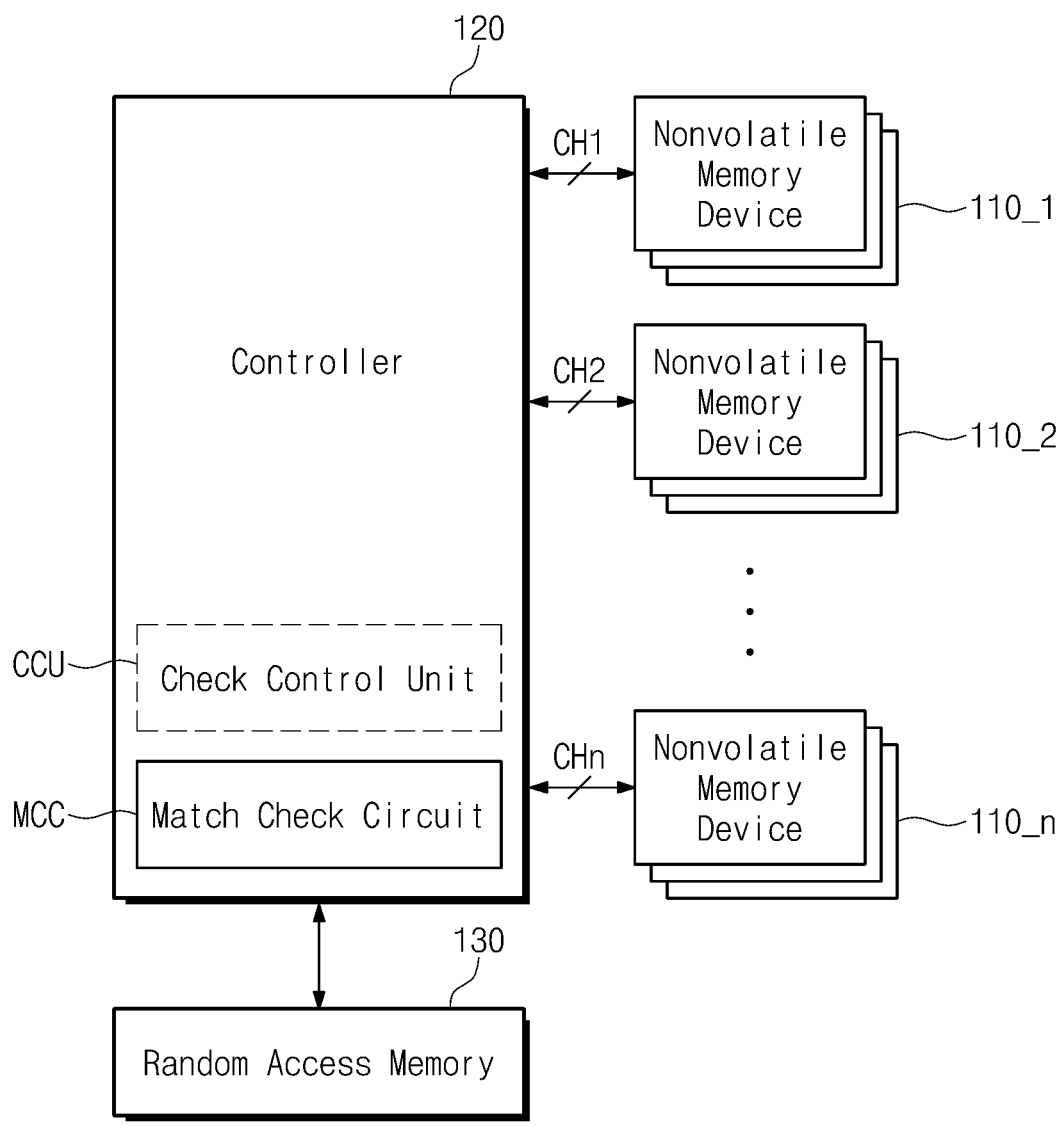
FIG. 10 is a block diagram illustrating a storage device according to an exemplary embodiment.

FIG. 10 is a block diagram illustrating a storage device 100 according to an example embodiment. Referring to FIG. 10, a storage device 100 may include nonvolatile memory devices 110_1 to 110_n, a controller 120, and a random access memory 130.

The nonvolatile memory devices 110_1 to 110_n may be configured to communicate with the controller 120 through a plurality of channels CH1 to CHn. The nonvolatile memory devices 110_1 may communicate with the controller 120 through a first channel CH1. The nonvolatile memory devices 110_2 may communicate with the controller 120 through a second channel CH2. The nonvolatile memory devices 110_n may communicate with the controller 120 through an n-th channel CHn.

The nonvolatile memory devices connected to each channel may share input/output channels and first control lines used to communicate with the controller 120. The nonvolatile memory devices connected to each channel may separately include second control lines used to communicate with the controller 120.

The nonvolatile memory devices connected to each channel may exchange data, a command, and/or an address with the controller 120 through the input/output channels.

The nonvolatile memory devices connected to each channel may receive, from the controller 120 through the first control lines, a command latch enable signal (CLE) indicating that a signal received from the controller 120 through the input/output channel is the command, an address latch enable signal (ALE) indicating that a signal received from the controller 120 through the input/output channel is an address, a read enable signal (/RE) generated by the controller 120 in a read operation and periodically toggled to be used to control timing, a write enable signal (/WE) activated by the controller 120 when the command or the address is transmitted, a write protection signal (/WP) activated by the controller 120 to prevent unintended writing or erasing when a power changes, and a data strobe signal (DQS) generated by the controller 120 in a write operation and periodically toggled to be used to adjust synchronization about data transmitted through the input/output channel.

The nonvolatile memory devices connected to each channel may respectively receive chip enable signals (/CE) for selecting at least one nonvolatile memory device of the nonvolatile memory devices through the second control lines.

The nonvolatile memory devices connected to each channel may transmit, to the controller 120 through the first control lines, the data strobe signal (DQS) generated based on the read enable signal (/RE) and periodically toggled to be used to adjust output synchronization about data.

The nonvolatile memory devices connected to each channel may respectively transmit, to the controller 120 through the second control lines, ready/busy signals (R/nB) indicating whether a program, erase or read operation is performed.

The nonvolatile memory devices connected to each channel may form paths. In example embodiments, when the number of the nonvolatile memory devices connected to each channel is 'm', the nonvolatile memory devices connected to each channel may form m number of paths. The nonvolatile memory devices 110_1 to 110_n may communicate with the controller 120 through n channels CH1 to CHn, and thus the storage device 100 may have a structure of n channels and m paths.

The controller 120 may alternately access m-path nonvolatile memory devices connected to one channel. The controller 120 may independently access nonvolatile memory devices connected with different channels. The controller 120 may alternately or simultaneously access nonvolatile memory devices connected to different channels.

The nonvolatile memory devices 110_1 to 110_n may include, but not limited to, a flash memory. For example, the nonvolatile memory devices 110_1 to 110_n may incorporate at least one of nonvolatile memory devices, such as a PRAM, an MRAM, an RRAM, and a FeRAM.

The controller 120 may be configured to control the nonvolatile memory devices 110_1 to 110_n and the random access memory 130. The controller 120 may use the random access memory 130 as a buffer memory, a cache memory, or a working memory. The controller 120 may write data in the nonvolatile memory devices 110_1 to 110_n, may read data from the nonvolatile memory devices 110_1 to 110_n, or may erase the data written in the nonvolatile memory devices 110_1 to 110_n.

The random access memory 130 may include at least one of a variety of random access memories, such as an SRAM, a DRAM, a synchronous DRAM (SDRAM), a PRAM, an MRAM, a RRAM, and a FeRAM.

The controller 120 may include a match check circuit MCC and a check control unit CCU. The check control unit CCU may control the match check circuit MCC to perform a match check based on locations, a bit pattern, an operator, and the number of samples SPN, which are received from the host device 20. The match check circuit MCC may perform a match check under control of the check control unit CCU.

In example embodiments, the nonvolatile memory devices 110_1 to 110_n may be connected to the controller 120 in the form of a wide input/output (WideIO). For example, the nonvolatile memory devices connected to different channels may share a control line through which the chip enable signal (/CE) is transmitted. The nonvolatile memory devices which share the control line may be accessed at the same time. Data lines of different channels may be used at the same time, and thus, the WideIO bandwidth may be improved.

The storage device 100 may include a solid state drive (SSD) or a hard disk drive (HDD). The storage device 100 may include memory cards, such as a personal computer (PC) card (e.g., personal computer memory card international association (PCMCIA)), a compact flash (CF) card, a smart media card (e.g., smart media (SM), smart media card (SMC)), a memory stick, a multimedia card (e.g., multimedia card (MMC), reduced size (RS)-MMC, MMCmicro), a secure digital (SD) card (e.g., secure digital (SD), miniSD, microSD, secure digital high capacity (SDHC)), a universal serial bus (USB) memory card, and a universal flash storage (UFS), and the like. The storage device 100 may include embedded memories such as an embedded multimedia card (eMMC), UFS, and a perfect page NAND (PPN).

Figure 11:
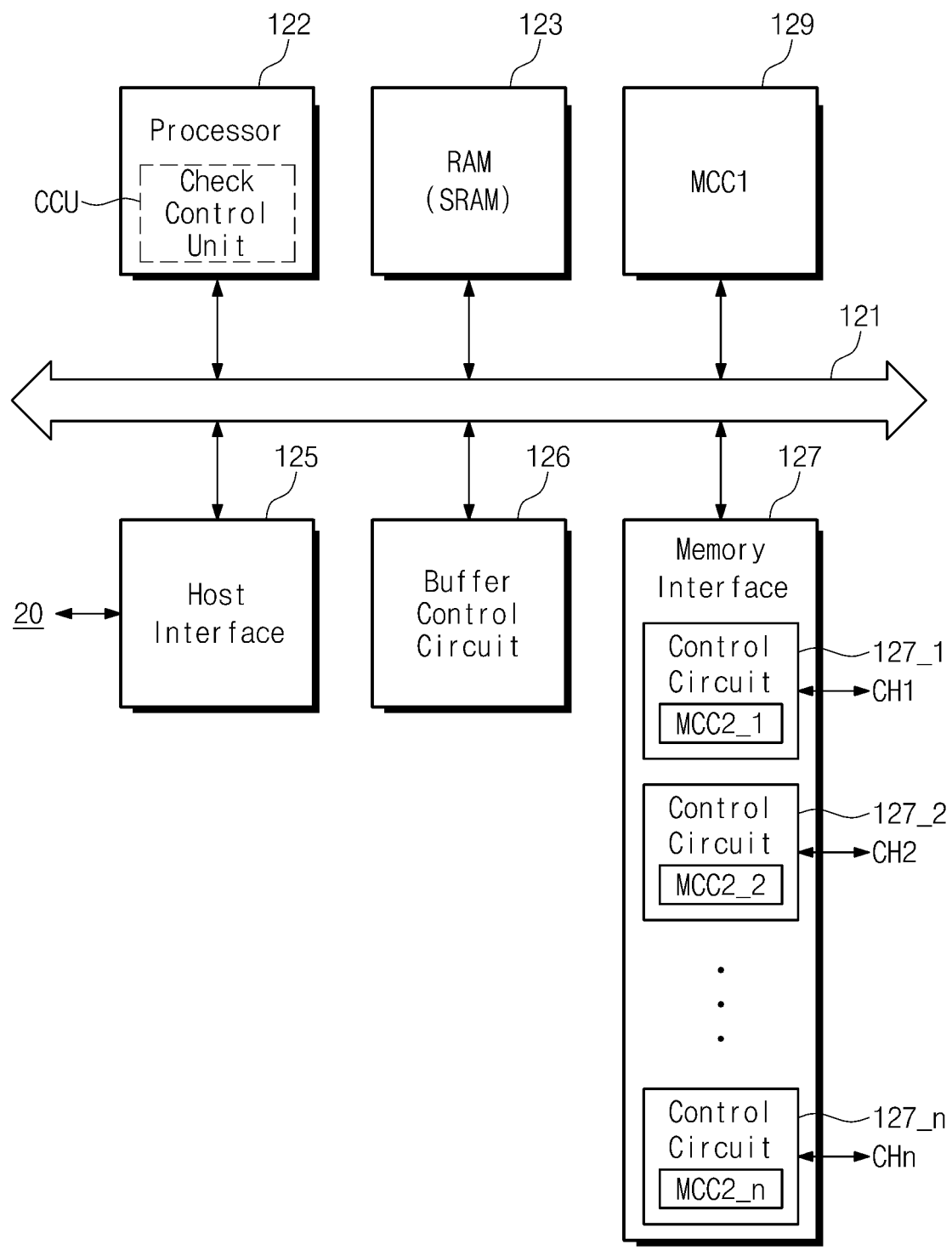
FIG. 11 is a block diagram illustrating a controller illustrated in FIG. 10.

FIG. 11 is a block diagram illustrating a controller 120 illustrated in FIG. 10. Referring to FIGS. 10 and 11, the controller 120 may include a bus 121, a processor 122, an RAM 123, a host interface 125, a buffer control circuit 126, and a memory interface 127.

The bus 121 may be configured to provide a channel among components of the controller 120.

The processor 122 may control an overall operation of the controller 120 and may execute a logical operation. The processor 122 may communicate with an external host device through the host interface 125, may communicate with the nonvolatile memory devices 110_1 to 110_n through the memory interface 127, and may communicate with the random access memory 130 through the buffer control circuit 126. The processor 122 may control the storage device 100 using the RAM 123 as a working memory, a cache memory, or a buffer memory.

The RAM 123 may be used as a working memory, a cache memory, or a buffer memory of the processor 122. The RAM 123 may store codes or commands that the processor 122 will execute. The RAM 123 may store data processed by the processor 122. The RAM 123 may include an SRAM.

A first match check circuit MCC1 129 may perform a match check about data which is read from the random access memory 130 through the buffer control circuit 126. In example embodiments, the first match check circuit MCC1 129 may be implemented in the form of hardware, software, or a combination of hardware and software. When the first match check circuit MCC1 129 is implemented in hardware, a speed at which the first match check circuit MCC1 129 performs a match check may be improved. In example embodiments, the first match check circuit MCC1 129 may be implemented in hardware as a portion of a buffer control circuit 126.

The host interface 125 may communicate with an external host device under control of the processor 122. The host interface 125 may convey communications using at least one of various communication methods, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), embedded MMC (eMMC), a dual in-line memory module (DIMM), a registered DIMM (RDIMM), a load reduced DIMM (LRDIMM), and the like.

The buffer control circuit 126 may control the RAM 130 under control of the processor 122.

The memory interface 127 may communicate with the nonvolatile memory devices 110_1 to 110_n under control of the processor 122. The memory interface 127 may include first to n-th control circuits 127_1 to 127_n respectively corresponding to first to n-th control channels CH1 to CHn. Each control circuit may control nonvolatile memory devices through corresponding channels.

The first to n-th control circuits 127_1 to 127_n may include second match check circuits MCC2_1 to MCC2_n, respectively. The second match check circuits MCC2_1 to MCC2_n may be configured to perform a match check about data which is read through the first to n-th control channels CH1 to CHn, respectively.

Each of the second match check circuits MCC2_1 to MCC2_n may be implemented in the form of hardware, software, or a combination of hardware and software. When each of the second match check circuits MCC2_1 to MCC2_n is implemented in hardware, a speed at which each of the second match check circuits MCC2_1 to MCC2_n performs a match check may be improved.

The processor 122 may include a check control unit CCU. The check control unit CCU may select read units, which correspond to the number of samples SPN, from among read units corresponding to locations received from the host device 20. The check control unit CCU may sequentially select read units corresponding to the number of samples SPN. The check control unit CCU may transmit a bit pattern and an operator to the match check circuits MCC1 129, and MCC2_1 to MCC2_n. The check control unit CCU may control the match check circuits MCC1 129, and MCC2_1 to MCC2_n.

For example, when data of the selected read unit is stored in the random access memory 130, the check control unit CCU may control the buffer control circuit 126 to read data of the selected read unit from the random access memory 130. The check control unit CCU may control the first match check circuit MCC1 129 to perform a match check about data which is read by the buffer control circuit 126.

For example, when data of the selected read unit is stored in the nonvolatile memory devices 110_1 to 110_n, the check control unit CCU may control the memory interface 127 to read data of the selected read unit from the nonvolatile memory devices 110_1 to 110_n. The check control unit CCU may control the second match check circuits MCC1_1 to MCC2_n to perform a match check about data which is read from the nonvolatile memory devices 110_1 to 110_n.

When the match check is completed in read units corresponding to the number of samples SPN, the check control unit CCU may calculate the selectivity SLT. The check control unit CCU may control the host interface 125 to output the calculated selectivity SLT to the host device 20.

In example embodiments, the check control unit CCU may be implemented in the form of software driven by the processor 122, hardware provided as a portion of the processor 122, or a combination of hardware and software.

Figure 12:
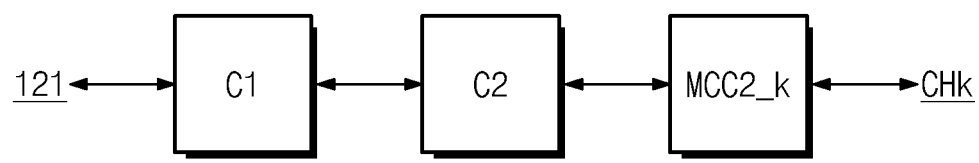
FIG. 12 is a block diagram illustrating a circuit of control circuits.

FIG. 12 is a block diagram illustrating one circuit 127_k of control circuits 127_1 to 127_n. Referring to FIGS. 11 and 12, the bus 121 may be connected to a channel CHk through a first circuit C1, a second circuit C2, and a second match check circuit MCC2_k.

For example, the first circuit C1 may include at least one of the encryption and decryption circuit, the randomization and derandomization circuit, a status transition and restoration circuit, and the error correction encoding and decoding circuit. The encryption and decryption circuit may encrypt data transmitted to the channels CHk and may decrypt data transmitted from the channels CHk. The randomization and derandomization circuit may randomize a bit pattern of data transmitted to the channel CHk and may derandomize a bit pattern of data transmitted from the channel CHk. The status transition and restoration circuit may reduce specific patterns from bits written in one memory cell, from among data transmitted to the channel CHk, and may restore the reduced patterns in data transmitted from the channel CHk. The error correction encoding and decoding circuit may generate a parity based on data which is transmitted to the channel CHk, may transmit the parity together with the data, and may correct an error in the data using the parity which is transmitted from the channel CHk together with the data.

For example, the second circuit C2 may include at least one of the encryption and decryption circuit, the randomization and derandomization circuit, the status transition and restoration circuit, and the error correction encoding and decoding circuit.

Figure 13:
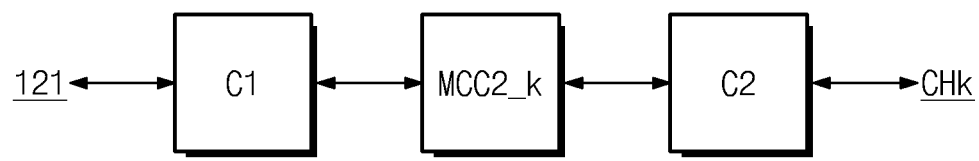
FIG. 13 is a block diagram illustrating another circuit of control circuits.

FIG. 13 is a block diagram illustrating another circuit 127_k of control circuits 127_1 to 127_n. Referring to FIGS. 11 and 13, the bus 121 may be connected to a channel CHk through a first circuit C, a second match check circuit MCC2_k, and a second circuit C2. For example, the first circuit C1 may include at least one of the encryption and decryption circuit, the randomization and derandomization circuit, the status transition and restoration circuit, and the error correction encoding and decoding circuit. For example, the second circuit C2 may include at least one of the encryption and decryption circuit, the randomization and derandomization circuit, the status transition and restoration circuit, and the error correction encoding and decoding circuit.

Figure 14:
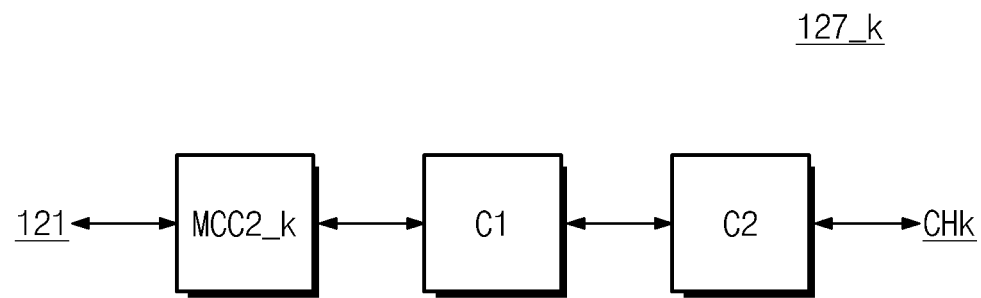
FIG. 14 is a block diagram illustrating another circuit of control circuits.

FIG. 14 is a block diagram illustrating another circuit 127_k of control circuits 127_1 to 127_n. Referring to FIGS. 11 and 14, the bus 121 may be connected to a channel CHk through a second match check circuit MCC2_k, a first circuit C1, and a second circuit C2. For example, the first circuit C1 may include at least one of the encryption and decryption circuit, the randomization and derandomization circuit, the status transition and restoration circuit, and the error correction encoding and decoding circuit. For example, the second circuit C2 may include at least one of the encryption and decryption circuit, the randomization and derandomization circuit, the status transition and restoration circuit, and the error correction encoding and decoding circuit.

Figure 15:
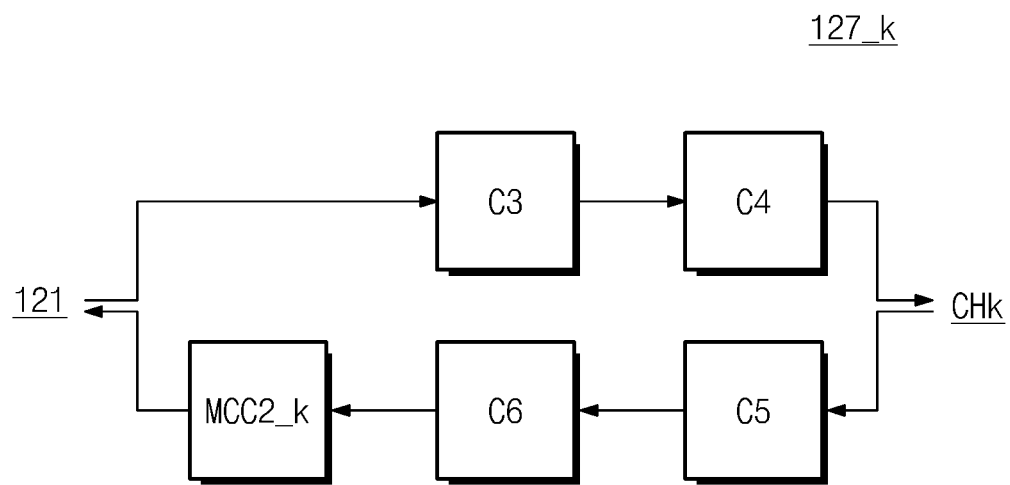
FIG. 15 is a block diagram illustrating another circuit of control circuits.

FIG. 15 is a block diagram illustrating another circuit 127_k of control circuits 127_1 to 127_n. Referring to FIGS. 11 and 15, data transmitted from the bus 121 to a channel CHk may be transmitted through a third circuit C3 and a fourth circuit C4. The third circuit C3 may include at least one of an encryption circuit, a randomization circuit, a status transition circuit, and an error correction encoding circuit. The fourth circuit C4 may include at least one of the encryption circuit, the randomization circuit, the status transition circuit, and the error correction encoding circuit.

Data transmitted from the channel CHk to the bus 121 may be transmitted through a fifth circuit C5, a sixth circuit C6, and a second match check circuit MCC2_k. The fifth circuit C5 may include at least one of a decryption circuit, a derandomization circuit, a status restoration circuit, and an error correction decoding circuit. The sixth circuit C6 may include at least one of the decryption circuit, the derandomization circuit, the status restoration circuit, and the error correction decoding circuit.

Figure 16:
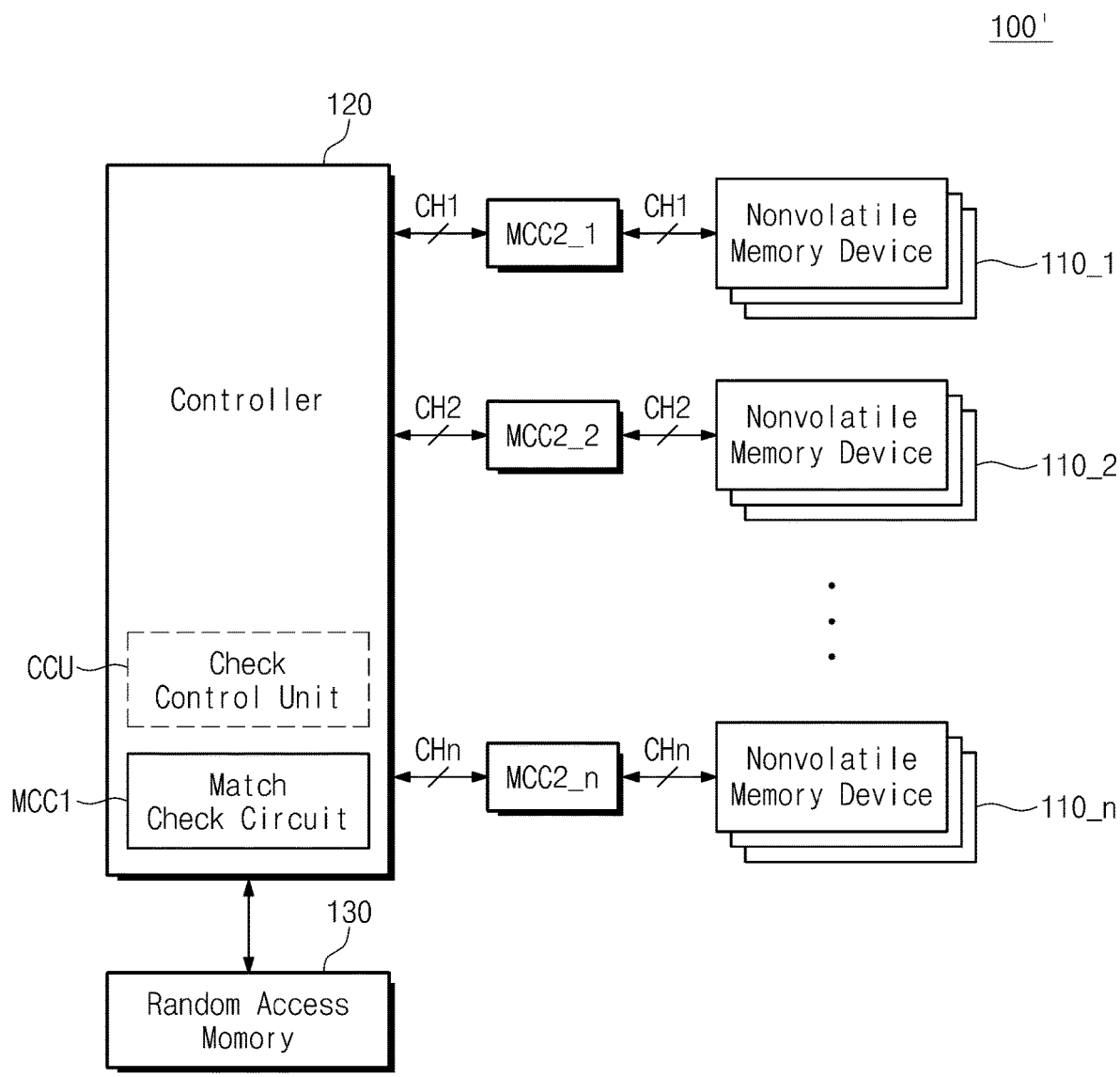
FIG. 16 is a block diagram illustrating another storage device in FIG. 10.

FIG. 16 is a block diagram illustrating another storage device 100 in FIG. 10. In the storage device 100' illustrated in FIG. 16, a first match check circuit MCC1 may be included in the controller 120. The second match check circuits MCC2_1 to MCC2_n may be respectively provided to the channels CH1 to CHn, which are between the controller 120 and the nonvolatile memory devices 110_1 to 110_n.

Figure 17:
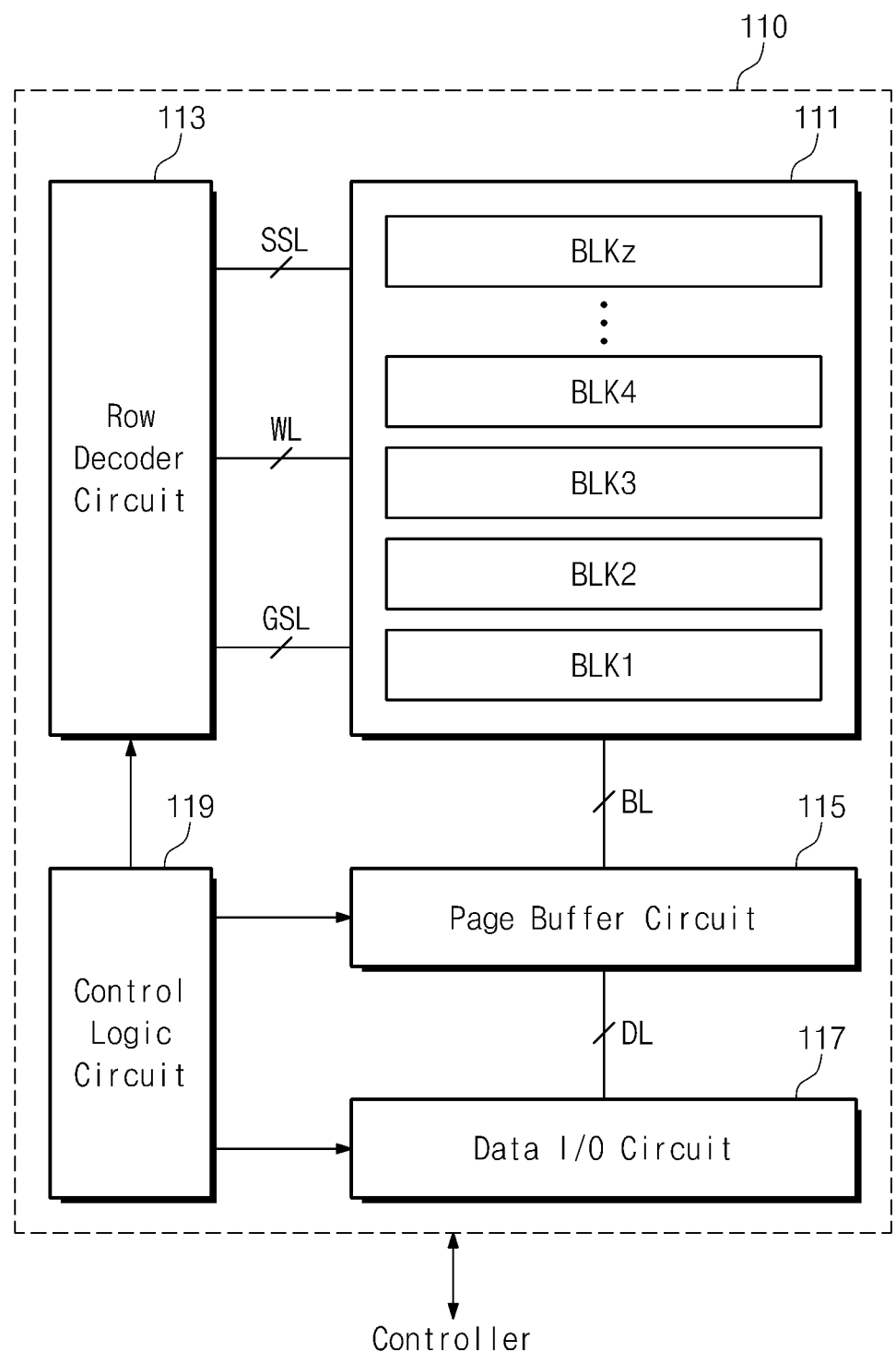
FIG. 17 is a block diagram illustrating a nonvolatile memory device according to an exemplary embodiment.

FIG. 17 is a block diagram illustrating a nonvolatile memory device 110 according to an example embodiment. Referring to FIG. 17, a nonvolatile memory device 110 may include a memory cell array 111, a row decoder circuit 113, a page buffer circuit 115, a data input/output circuit 117, and a control logic circuit 119.

The memory cell array 111 may include a plurality of memory blocks BLK1 to BLKz. Each memory block may include a plurality of memory cells. Each memory block may be connected to the row decoder circuit 113 through at least one ground selection line GSL, a plurality of word lines WL, and a string selection line SSL. Each memory block may be connected to the page buffer circuit 115 through a plurality of bit lines BL. The memory blocks BLK1 to BLKz may be connected in common to the bit lines BL. The memory cells in the memory blocks BLK1 to BLKz may have the same structure.

In example embodiments, erasing may be performed in the memory block. That is, the memory cells in the memory cell array 111 may be erased in one memory block. The memory cells in a memory block may be erased at the same time. In other example embodiments, each memory block may be divided into a plurality of sub-blocks. Erasing may be performed in one sub-block.

In example embodiments, each of the memory blocks BLK1 to BLKz may include a physical storage space which is identified by a block address. Each of the word lines WL may correspond to the physical storage space which is identified by a row address. Each of the bit lines BL may correspond to a physical storage space which is identified by a column address.

The row decoder circuit 113 may be connected to the memory cell array 111 through a plurality of ground selection lines GSL, the word lines WL, and a plurality of string selection lines SSL. The row decoder circuit 113 may operate under control of the control logic circuit 119. The row decoder circuit 113 may decode an address received from a controller 120 through an input/output channel and may control voltages to be applied to the string selection lines SSL, the word lines WL, and the ground selection lines GSL based on the decoded address.

For example, in a program operation, the row decoder circuit 113 may apply a program voltage (VGPM) to a selected word line in a memory block selected by an address and may apply a pass voltage (VPASS) to unselected word lines in the selected memory block. In a read operation, the row decoder circuit 113 may apply a selection read voltage (VRD) to a selected word line in the memory block selected by an address, and may apply a non-selection read voltage (VREAD) to unselected word lines in the selected memory block. In an erasing operation, the row decoder circuit 113 may apply erase voltages (e.g., a ground voltage or low voltages of which the level is similar to that of the ground voltage) to word lines in the memory block selected by an address.

The page buffer circuit 115 may be connected to the memory cell array 111 through the bit lines BL. The page buffer circuit 115 may be connected to the data input/output circuit 117 through a plurality of data lines DL. The page buffer circuit 115 may operate under control of the control logic circuit 119.

In a program operation, the page buffer circuit 115 may store data to be programmed in memory cells. The page buffer circuit 115 may apply voltages to the bit lines BL based on the stored data. The page buffer circuit 115 may function as a write driver in a program operation. In a read operation, the page buffer circuit 115 may sense voltages on the bit lines BL and may store the sensed results. The page buffer circuit 115 may function as a sense amplifier in a read operation.

The data input/output circuit 117 may be connected to the page buffer circuit 115 through the data lines DL. The data input/output circuit 117 may output data, which is read by the page buffer circuit 115, to the controller 120 through the input/output channel and may transmit data, which is received from the controller 120 through the input/output channel, to the page buffer circuit 115.

The control logic circuit 119 may receive a command from the controller 120 through the input/output channel and may receive a control signal therefrom through a control channel. The control logic circuit 119 may receive a command which is received through the input/output channel, may route an address, which is received through the input/output channel, to the row decoder circuit 113, and may route data, which is received through the input/output channel, to the data input/output circuit 117, in response to the control signal. The control logic circuit 119 may decode the received command and may control the nonvolatile memory device 110 based on the decoded command.

In example embodiments, the control logic circuit 119 may generate a data strobe signal (DQS) based on a read enable signal (/RE) received from the controller 120 through the input/output channel. The data strobe signal (DQS) thus generated may be outputted to the controller 120 through the control channel. In a write operation, the control logic circuit 119 may receive the data strobe signal (DQS) from the controller 120 through the control channel.

FIG. 18 is a circuit diagram illustrating a memory block BLKa according to an example embodiment. Referring to FIG. 18, the memory block BLKa may include a plurality of cell strings CS11, CS21, CS12, and CS22. The cell strings CS11, CS21, CS12, and CS22 may be arranged in a matrix of rows and columns.

For example, the cell strings CS11 and CS12 arranged along a row direction may constitute a first row, and the cell strings CS21 and CS22 arranged along the row direction may constitute a second row. The cell strings CS11 and CS21 arranged along a column direction may constitute a first column, and the cell strings CS12 and CS22 arranged along the column direction may constitute a second column.

Each cell string may contain a plurality of cell transistors. The cell transistors may include ground selection transistors GST, memory cells MC1 to MC6, and string selection transistors SSTa and SSTb. The ground selection transistors GST, memory cells MC1 to MC6, and string selection transistors SSTa and SSTb in each cell string may be stacked in a height direction perpendicular to a plane (e.g., a plane of a substrate of the memory block BLKa) on which the cell strings CS11, CS21, CS12, and CS22 are arranged along the rows and the columns.

Each cell transistor may be a charge trap type cell transistor of which the threshold voltage changes according to the amount of charges trapped in an insulating layer thereof.

A source terminal of each of lowermost ground selection transistors GST may be connected in common to a common source line CSL.

Control gates of ground selection transistors GST of the cell strings CS11, CS21, CS12, and CS22 may be connected to ground selection lines GSL1 and GSL2, respectively. In example embodiments, ground selection transistors GST in the same row may be connected to the same ground selection line, and ground selection transistors GST of different rows may be connected to different ground selection lines. For example, the ground selection transistors GST of cell strings CS11 and CS12 in the first row may be connected to a first ground selection line GSL1, and the ground selection transistors GST of the cell strings CS21 and CS22 in the second row may be connected to a second ground selection line GSL2.

Control gates of memory cells that are placed at the same height (or the same order) from the substrate (or the ground selection transistors GST) are connected in common to a word line. Control gates of memory cells that are placed at different heights (or different orders) are connected to different word lines WL1 to WL6. For example, memory cells MC1 may be commonly connected to the word line WL1. Memory cells MC2 may be commonly connected to a word line WL2. Memory cells MC3 may be commonly connected to a word line WL3. Memory cells MC4 may be commonly connected to a word line WL4. Memory cells MC5 may be commonly connected to a word line WL5. Memory cells MC6 may be commonly connected to the word line WL6.

In first string selection transistors SSTa, having the same height (or the same order), of the cell strings CS11, CS21, CS12, and CS22, control gates of the first string selection transistors SSTa in different rows may be connected to different string selection lines SSL1a and SSL2a, respectively. For example, the first string selection transistors SSTa of the cell strings CS11 and CS12 may be connected in common to the string selection line SSL1a, and the first string selection transistors SSTa of the cell strings CS21 and CS22 may be connected in common to the string selection line SSL2a.

In second string selection transistors SSTb, having the same height (or the same order), of the cell strings CS11, CS21, CS12, and CS22, control gates of the second string selection transistors SSTb in different rows may be connected to the different string selection lines SSL1a and SSL2a. For example, the second string selection transistors SSTb of the cell strings CS11 and CS12 may be connected in common to the string selection line SSL1b, and the second string selection transistors SSTb of the cell strings CS21 and CS22 may be connected in common to the string selection line SSL2b.

That is, cell strings in different rows may be connected to different string selection lines. String selection transistors, having the same height (or the same order), of cell strings in the same row may be connected to the same string selection line. String selection transistors, having different heights (or different orders), of cell strings in the same row may be connected to different string selection lines.

In example embodiments, string selection transistors of cell strings in the same row may be connected in common to the string selection line. For example, the string selection transistors SSTa and SSTb of the cell strings CS11 and CS12 in the first row may be connected in common to the string selection line, and the string selection transistors SSTa and SSTb of the cell strings CS21 and CS22 in the second row may be connected in common to the string selection line.

Columns of the cell strings CS11, CS21, CS12, and CS22 may be connected to different bit lines BL1 and BL2, respectively. For example, the string selection transistors SSTb of the cell strings CS11 and CS21 in the first column may be connected in common to the bit line BL1, and the string selection transistors SSTb of the cell strings CS12 and CS22 in the second column may be connected in common to the bit line BL2.

The cell strings CS11 and CS12 may be provided on a first plane, and the cell strings CS21 and CS22 may be provided on a second plane.

In the memory block BLKa, memory cells of each plane placed at the same height may provide a physical page. A physical page may be a unit of writing and reading the memory cells MC1 to MC6. For example, one plane of the memory block BLKa may be selected by the string selection lines SSL1a, SSL1b, SSL2a, and SSL2b. The cell strings CS11 and CS12 on the first plane may be respectively connected to the bit lines BL1 and BL2 when a turn-on voltage is supplied to the string selection lines SSL1a and SSL1b and a turn-off voltage is supplied to the string selection lines SSL2a and SSL2b. That is, the first plane may be selected. The cell strings CS21 and CS22 on the second plane may be respectively connected to the bit lines BL1 and BL2 when the turn-on voltage is supplied to the string selection lines SSL2a and SSL2b and the turn-off voltage is supplied to the string selection lines SSL1a and SSL1b. That is, the second plane may be selected.

On a selected plane, a row of memory cells MC1 to MC6 may be selected by the word lines WL1 to WL6. In the selected row, a selection voltage may be applied to the second word line WL2, and a non-selection voltage may be applied to the remaining word lines WL1 and WL3 to WL6. That is, a physical page which corresponds to the second word line WL2 of the second plane may be selected by adjusting voltages on the string selection lines SSL1a, SSL1b, SSL2a, and SSL2b and the word lines WL1 to WL6. A write or read operation may be performed with respect to memory cells MC2 in the selected physical page.

In the memory block BLKa, the memory cells MC1 to MC6 may be erased for the memory block or for the sub-block. When erasing is performed for the memory block, all memory cells MC1 to MC6 in the memory block BLKa may be simultaneously erased according to an erase request (e.g., an erase request from an external memory controller). When erasing is performed for the sub-block, a portion of memory cells MC1 to MC6 in the memory block BLKa may be simultaneously erased according to an erase request (e.g., an erase request from an external memory controller), and another portion thereof may be erase-inhibited. A low voltage (e.g., a ground voltage or a low voltage of which the level is similar to that of the ground voltage) may be supplied to a word line connected to the erased memory cells MC1 to MC6, and a word line connected to erase-inhibited memory cells MC1 to MC6 may be floated.

In example embodiments, the memory block BLKa may include a physical storage space which is identified by a block address. Each of the word lines WL1 to WL6 may correspond to a physical storage space which is identified by a row address. Each of the bit lines BL1 and BL2 may correspond to a physical storage space which is identified by a column address. Each of string selection lines SSL1a and SSL2a or SSL1b and SSL2b in different rows or each of the ground selection lines GSL1 and GSL2 in different rows may correspond to a physical storage space which is identified by a plane address.

The memory block BLKa shown in FIG. 18 is only an example and the scope and spirit of the inventive concept may not be limited thereto. For example, the number of rows of cell strings may increase or decrease. As the number of rows of cell strings is changed, the number of string or ground selection lines connected to rows of the cell strings and the number of cell strings connected to a bit line may also be changed.

The number of columns of cell strings may increase or decrease. As the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In example embodiments, the memory cells MC1 to MC6 in a physical page may correspond to at least three logical pages. For example, k bits (k being an integer of 2 or more) may be programmed in one of the memory cell MC1 to MC6. In the memory cells MC1 to MC6 of one physical page, k logical pages may be implemented with k bits programmed in each of the memory cell MC1 to MC6.

For example, a physical page may include a physical storage space which is identified by a block address, a row address, a column address, and a plane address. One physical page may include two or more logical pages. Each of the logical pages may include a logical storage space which is identified by an additional address (or an offset) for identifying logical pages as well as an address of a physical address.

In an example embodiment, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an example embodiment, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Patent Application Publication No. 2011/0233648.

In example embodiments, a memory cell array 111 in each nonvolatile memory device may be provided. A read unit of the storage device 100 or 100' may be a page (e.g., a logical page or a physical page).

Two or more memory cell arrays may be provided to each nonvolatile memory device, and two or more pages in each of two or more memory cell arrays may be accessed at the same time. For example, a super page may be implemented with two or more pages. A read unit of the storage device 100 or 100' may be a super page.

Two or more pages (or super pages) in each of two or more nonvolatile memory devices may be accessed at the same time. In this case, a super page (or upper super page) may be implemented with two or more pages (or super pages) in each of two or more nonvolatile memory devices. A read unit of the storage device 100 or 100' may be a super page (or upper super page).

An example embodiment may provide a query plan based on selectivity about read units of a storage device and may search for data in the storage device based on the selectivity about the read units of the storage device. Therefore, a count of accesses to the storage device in searching for data may be reduced and a speed at which the data is searched from the storage device may be improved.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A method of searching for data in a storage device, the method comprising:

determining, by the storage device, selectivity about read units of each table stored in the storage device, based on a ratio of a number of first read units, to which field values related to a filtering predicate included in a query are distributed in each table, to a number of second read units of each table stored in the storage device; and searching for the data in the storage device based on the selectivity about the read units, wherein each of the read units has an amount of data read by the storage device in one read operation.

2. The method of claim 1, wherein the determining comprises:

detecting a filtering predicate from the query; and transmitting, to the storage device, locations in which a table corresponding to the filtering predicate is stored, a bit pattern about the filtering predicate, and an operator associated with the filtering predicate.

3. The method of claim 2, wherein the determining further comprises counting, by the storage device, the number of the first read units, which correspond to the bit pattern and the operator, from among the second read units corresponding to the locations.

4. The method of claim 3, wherein the determining further comprises determining, by the storage device, the selectivity by dividing the number of the first read units by the number of the second read units corresponding to the locations.

5. The method of claim 2, wherein the determining further comprises transmitting a number of samples to the storage device, the samples being among third read units corresponding to the locations.

6. The method of claim 5, wherein the determining further comprises counting, by the storage device, a number of fourth read units, which correspond to the bit pattern and the operator, from among fifth read units corresponding to the number of the samples.

7. The method of claim 6, wherein the determining further comprises determining, by the storage device, the selectivity by dividing the number of the fourth read units by a number of the fifth read units corresponding to the number of the samples.

8. The method of claim 1, wherein the searching comprises:

setting a table, which corresponds to the selectivity, as a first search target, when the selectivity about the read units is smaller than a threshold value; and setting the first search target, which does not correspond to the selectivity, when the selectivity about the read units is greater than or equal to the threshold value.

9. The method of claim 8, wherein the searching further comprises, when at least two selectivities are determined based on the query, selecting lowest selectivity among the at least two selectivities.

10. A method of searching for data in a storage device, the method comprising:

receiving, by the storage device, locations in which the data are stored, a bit pattern about a filtering predicate, and an operator associated with the filtering predicate, and a number of samples;

counting, by the storage device, a number of first read units, which correspond to the bit pattern and the operator, from among second read units corresponding to the locations;

determining, by the storage device, selectivity about the filtering predicate based on the number of the first read units; and transmitting, by the storage device, the determined selectivity to a host device to be used to search for the data, wherein the counting the number of the first read units comprises counting the number of the first read units from among third read units corresponding to the number of samples, and wherein the determining the selectivity comprises determining the selectivity by dividing the number if the first read units by a number of the third read units.

11. The method of claim 10, wherein the storage device comprises:
   nonvolatile memory devices;
   a random access memory; and
   a controller configured to control the nonvolatile memory devices and the random access memory.

12. The method of claim 11, wherein the counting comprises:
   when first data corresponding to at least a portion of the second read units is stored in the random access memory, counting the number of the first read units based on the first data, and
   when second data corresponding to at least a remaining portion of the second read units is stored in the nonvolatile memory devices, further counting the number of the first read units based on the second data.

13. The method of claim 12, wherein the storage device further comprises:
   a first match check circuit configured to determine whether the first data which is read from the random access memory corresponds to the bit pattern and the operator, and
   a second match check circuit configured to determine whether the second data which is read from the nonvolatile memory device corresponds to the bit pattern and the operator.

14. The method of claim 13, wherein at least one of the first match check circuit and the second match check circuit is included in the controller.

15. A method of searching for data in a storage device, the method comprising:
   detecting a filtering predicate from a query;
   selecting a table corresponding to the filtering predicate and determining, by the storage device, selectivity about read units of the table based on locations at which data of the table is stored, a bit pattern about the filtering predicate, and an operator associated with the filtering predicate; and
   determining the table as a first search target based on the selectivity,
   wherein each of the read units has an amount of data read by the storage device in one read operation, and
   wherein the selectivity about read units indicates a ratio of a number of second read units, to which field values related to the filtering predicate are distributed in each table, to a number of first read units of each table stored in the storage device.

16. The method of claim 15, wherein the determining the selectivity comprises:
   performing a match check whether the first read units corresponding to the locations correspond to the bit pattern and the operator; and
   determining the selectivity based on a result of the match check.

17. The method of claim 16, wherein the determining the selectivity based on the result of the match check comprises determining the selectivity based on a ratio between the number of the first read units and the number of the second read units, which, among the first read units, correspond to the bit pattern and the operator.

18. The method of claim 16, further comprising selecting sample read units among the first read units, wherein the match check is performed with respect to the sample read units and the selectivity is determined based on a result of the match check with respect to the sample read units.

19. The method of claim 18, wherein the determining table comprises determining the table as the first search target based on the selectivity that is smaller than a threshold.

* * * * *